United States Patent [19]
Gustafsson

[11] Patent Number: 5,957,811
[45] Date of Patent: Sep. 28, 1999

[54] SINGLE-PEDAL SYSTEM IN MOTOR VEHICLES AND A METHOD FOR FORMING SUCH A SINGLE-PEDAL SYSTEM

[75] Inventor: Sven Gustafsson, Hörby, Sweden

[73] Assignee: Safebrake Nomix AB, Hörby, Sweden

[21] Appl. No.: 09/119,230

[22] Filed: Jul. 21, 1998

Related U.S. Application Data

[63] Continuation of application No. PCT/SE97/00122, Jan. 24, 1997.

[30] Foreign Application Priority Data

Jan. 31, 1996 [SE] Sweden .................................. 9600339

[51] Int. Cl.$^6$ ..................................................... B60K 41/20
[52] U.S. Cl. ......................... 477/214; 477/211; 74/480 R; 74/513; 29/401.1
[58] Field of Search ..................................... 477/209, 210, 477/211, 214; 74/478, 480, 513; 29/401.1

[56] References Cited

U.S. PATENT DOCUMENTS

| | | | |
|---|---|---|---|
| 2,203,777 | 6/1940 | Detmers | 477/212 |
| 5,596,906 | 1/1997 | Lin | 477/214 X |
| 5,599,255 | 2/1997 | Ki-Dong et al. | 477/214 X |

FOREIGN PATENT DOCUMENTS

| | | |
|---|---|---|
| 0522556 | 1/1993 | European Pat. Off. . |
| 372737 | 1/1975 | Sweden . |
| 409834 | 9/1979 | Sweden . |
| 1 303 998 | 1/1973 | United Kingdom . |

*Primary Examiner*—Rodney H. Bonck
*Assistant Examiner*—Ankur Parekh
*Attorney, Agent, or Firm*—Burns, Doane, Swecker & Mathis, L.L.P.

[57] ABSTRACT

The invention relates to a single-pedal system for controlling the speed of the engine and the braking effect in a motor vehicle. A pedal holder (1) is mounted for movement from a resting position for effecting braking of the vehicle. A pedal (3) is moveably supported on the pedal holder (1) for controlling the speed of the engine of the vehicle. A returning means is arranged to return the pedal holder (1) to the resting position. A locking means (10) is arranged to hold, in a non-braking state of function of the system, the pedal holder (1) in its resting position and, when passing to a braking state of function of the system, to release the pedal holder (1) from the resting position if a compressive force exceeding a predetermined value is applied to the latter.

19 Claims, 6 Drawing Sheets

SINGLE-PEDAL SYSTEM IN MOTOR VEHICLES AND A METHOD FOR FORMING SUCH A SINGLE-PEDAL SYSTEM

This is a continuation of International Application No. PCT/SE97/00122, filed Jan. 24, 1997, that designates the United States of America.

FIELD OF THE INVENTION

The present invention relates generally to a single-pedal system for controlling the speed of the engine and the braking effect in a motor vehicle. More specifically, the invention concerns a single-pedal system according to the preamble to claim 1. Such a single-pedal system is disclosed in SE 7604223-3. The invention also concerns a method for forming such a single-pedal system by converting an existing multiple-pedal system with separate brake and gas pedals.

BACKGROUND ART

A motor vehicle normally has three foot-operated pedals, a clutch pedal, a brake pedal and an accelerator. The driver operates the clutch pedal by his left foot and moves his right foot between the brake pedal and the accelerator. The controlling of the speed of the engine is effected by the driver placing his right heel on the floor of the vehicle and then turning the right foot forwards-downwards about the ankle joint. To brake the vehicle, the driver presses his right foot against the floor in the direction of the lower part of the leg.

A vehicle with automatic gear-change has no clutch pedal, but the controlling of the speed of the engine and braking must in any case, according to existing regulations, be carried out as described above, i.e. by moving the right foot between the brake pedal and the accelerator.

Above all in emergency braking, this multiple-pedal system causes elements of considerable risk. In an emergency, the stopping distance is prolonged owing to the time required for moving the right foot, and besides the moving of the foot involves a risk that the driver steps on the wrong pedal or slips on the brake pedal.

In order to obviate these elements of risk, various combined gas and brake pedals (single-pedal systems) have already been suggested, in which one tries to minimise the required movement of the right foot in an emergency.

SE 7604223-3 discloses a single-pedal system having a pivotally mounted pedal holder, which supports a pedal, which is pivoted to a shaft which is arranged on the pedal holder and extends perpendicular to the pivoting plane of the pedal holder. The speed of the engine and normal braking are controlled by means of mutually opposed pedal movements about said shaft. The speed of the engine is increased by turning the right foot forwards about the ankle joint, and normal braking takes place by an opposed turning backwards of the right foot. During these movements of the foot, the pedal holder is actuated by a spring means towards a resting position. The pedal holder is arranged in such a manner that emergency braking of the vehicle can be carried out by a relatively powerful pressing-down of the pedal in the direction of the lower part of the leg, whereby the pedal holder moves away from the resting position in the direction of the lower part of the leg. After the emergency braking, the pedal holder is returned to its resting position by the spring means.

The single-pedal system according to SE 7604223-3, however, suffers from a number of drawbacks, in particular:

The driver cannot operate the pedals in conventional manner. Normal braking takes place in a manner which is completely new to the driver—turning of the foot upwards about the ankle joint. What makes matters worse is that emergency braking is carried out in a different manner. When the user has finally got used to this new manner of braking normally, the practised reflex of pressing the brake pedal in the direction of the lower part of the leg in an emergency is deteriorated. Admittedly, the system may theoretically result in shorter reaction times compared with a conventional multiple-pedal system, but in practice the reaction times will probably be considerable since the movement for emergency braking no longer conforms with the movement for normal braking of the system and therefore is not made by instinct.

A comparatively long learning time for the driver to function, if at all possible, in a reliable manner. Moreover, difficulties and risks will probably arise when changing to a car having a conventional multiple-pedal system.

Since the spring means produces an increasing resistance as the pedal is pressed down in the direction of the lower part of the leg, this single pedal system results in a considerably deteriorated pedal pressure in case of an emergency braking. When the pedal pressure is urgently needed, it is thus reduced by the spring means which counteracts the emergency braking motion.

Moreover, it would probably be difficult to introduce this prior-art single-pedal system on the market since the user must adapt himself to the pedals and not the opposite.

The single-pedal system also requires relatively great modifications when installing it an existing vehicle. It will thus be expensive and complicated to exchange existing, conventional multiple-pedal systems for this single-pedal system.

EP-A-0 522 556 discloses a pedal system having separate gas and brake pedals, which, however, are arranged in such manner that they can be operated by the driver's one foot. A separate brake pedal, when not loaded by the driver's foot, is kept in a resting position by means of two cooperating permanent magnets. A separate turnable accelerator is arranged above the brake pedal. The speed of the engine is controlled by turning the accelerator sideways while holding the heel against the floor. Both normal braking and emergency braking are carried out by the driver turning his foot forwards-downwards about the ankle joint. Also this known pedal system thus requires movement patterns which are completely different from conventional multiple-pedal systems and thus involves the above-mentioned drawbacks.

SUMMARY OF THE INVENTION

Therefore, the object of the invention is to provide an improved single-pedal system for controlling the speed of the engine and the braking effect of motor vehicles, which obviates the above-mentioned drawbacks of the prior-art technique completely or at least to an essential extent. The single-pedal system should thus shorten the reaction time in emergency braking and eliminate, or at least to an essential extent reduce the risk that, in such situations, the driver steps on the wrong pedal or his foot slips.

A special object of the present invention is to provide such a single-pedal system which can easily and without great modifications be installed in practically every motor vehicle which today has separate gas and brake pedals. The single-pedal system according to the invention should also be able to function together with conventional brake systems.

A special object of the single-pedal system according to the invention is that when operating, the driver should be able to use a practised movement pattern, i.e. a turning movement about the ankle joint for controlling the speed of the engine and a pressing-down movement in the direction of the lower part of the leg by means of the thigh muscles to accomplish braking. Preferably, normal braking and emergency braking should be carried out according to the same or similar movement patterns of the driver.

A further object of the invention is to provide a single-pedal system which can be used in combination with electronic throttle levers.

According to the invention, these and other objects are achieved by a single-pedal system of the type as defined in the accompanying claims.

Thus, the invention provides a single-pedal system for controlling the speed of the engine and the braking effect in a motor vehicle, said system comprising a pedal holder, which is mounted for movement from a resting position for effecting braking of the vehicle, and a pedal, which is movably supported on the pedal holder for controlling the speed of the engine of the vehicle. The single-pedal system is characterised by a locking means which is arranged to hold, in a non-braking state of function of the system, the pedal holder in its resting position and, for passing to a braking state of function of the system, to permit the pedal holder to be moved from its resting position if a force exceeding a predetermined value is applied to the pedal holder.

According to the invention, also a method is provided for forming such a single-pedal system by converting an existing multiple-pedal system having separate brake and gas pedals, in which use is made of an existing brake pedal holder as a holder for the combined gas and brake pedal according to the invention.

The above-mentioned term "resting position" should here also be considered to comprise such cases where the returning position is not an exactly defined position, but rather a position range, in which the pedal holder is essentially fixed and has a relatively great initial inertia when passing to the braking state of function of the system.

In the normal case, the system is provided with a retracting means, such as a return spring and/or a return force generated by a brake system, arranged to urge the pedal holder in the direction of the non-braking state of function, as is per se known from conventional brake pedals.

In the normal case, the above-mentioned force is applied to the pedal holder through said pedal, which supports the driver's one foot.

An important advantage of the inventive single-pedal system is that it may be designed such that the user can use the same movement pattern as in conventional pedal systems with separate gas and brake pedals. The system according to the invention can thus be designed such that the speed of the engine is accelerated by the foot being turned forwards about the ankle joint in traditional manner, whereas normal braking as well as emergency braking take place by pressing the pedal in the direction of the lower part of the leg. In an emergency, the driver can, as a reflex action, press the pedal forcefully to overcome the retaining locking force of the locking means in a quick and easy manner. In this case, there is also no risk that the driver presses the wrong pedal in an emergency since no change of pedal is required.

A further advantage is that the single-pedal system according to the invention can be designed in such manner that it can be mounted in conventional motor vehicles without difficulty. The existing accelerator is removed, and the existing brake pedal is exchanged for an insert having a single-pedal system according to the invention. The original brake system can in conventional manner be connected to the pedal holder. Further the pedal can be connected, for instance by means of a throttle cable, to the engine in prior-art manner. The invention is also usable in combination with electronic throttle levers.

According to a preferred embodiment, the locking means comprises an electromagnet coacting with the pedal holder. By applying a suitable operating voltage over the electromagnet, it is possible to adjust, in an extremely simple manner, the locking force at a level which is convenient for the driver, for instance by means of a control on the dashboard of the vehicle. In case of a power failure, the vehicle can besides still be readily braked since the locking force will then disappear. A further advantage from the viewpoint of safety is the non-existence of a mechanical connection in the fixing of the pedal holder. There is thus no risk that the pedal holder is permanently locked in position owing to failing or jamming components. It should be especially noted that this embodiment using locking by means of an electromagnet implies that the locking force is negligible by being overcome by the user applying a sufficiently great compressive force to the pedal.

According to a further preferred embodiment, the single-pedal system is provided with a disengaging means, preferably a microswitch, which is arranged to disengage the pedal holder when the pedal is in a certain position, preferably in such a position that no increase or essentially no increase of the speed of the engine is accomplished. As a result, an advantageous possibility of a soft braking effect is obtained. Besides, the normal braking will be controlled by will-power since such braking takes place when the driver deliberately puts the pedal in a certain position, while the emergency braking takes place instinctively by pressing the pedal in the direction of the lower part of the leg.

In a further embodiment, the pedal is provided with a lower support for receiving the driver's heel portion. This results in a more comfortable driving position, and the security will be improved further since the driver's foot is fixed to the pedal in a more satisfactory manner.

In one embodiment, the pedal is connected to the engine of the vehicle in such manner that a movement of the pedal holder from its resting position to its braking position results in a reduced speed of the engine. This is advantageous since it eliminates the risk of racing the engine while braking the vehicle.

The embodiments above can be combined with each other.

BRIEF DESCRIPTION OF THE DRAWINGS

The invention and its advantages will now be described in more detail with reference to the accompanying drawings, which for the purpose of exemplification and non-restriction show preferred embodiments of the invention and in which.

DESCRIPTION OF THE PREFERRED EMBODIMENTS OF THE INVENTION

Figures 1, 2:
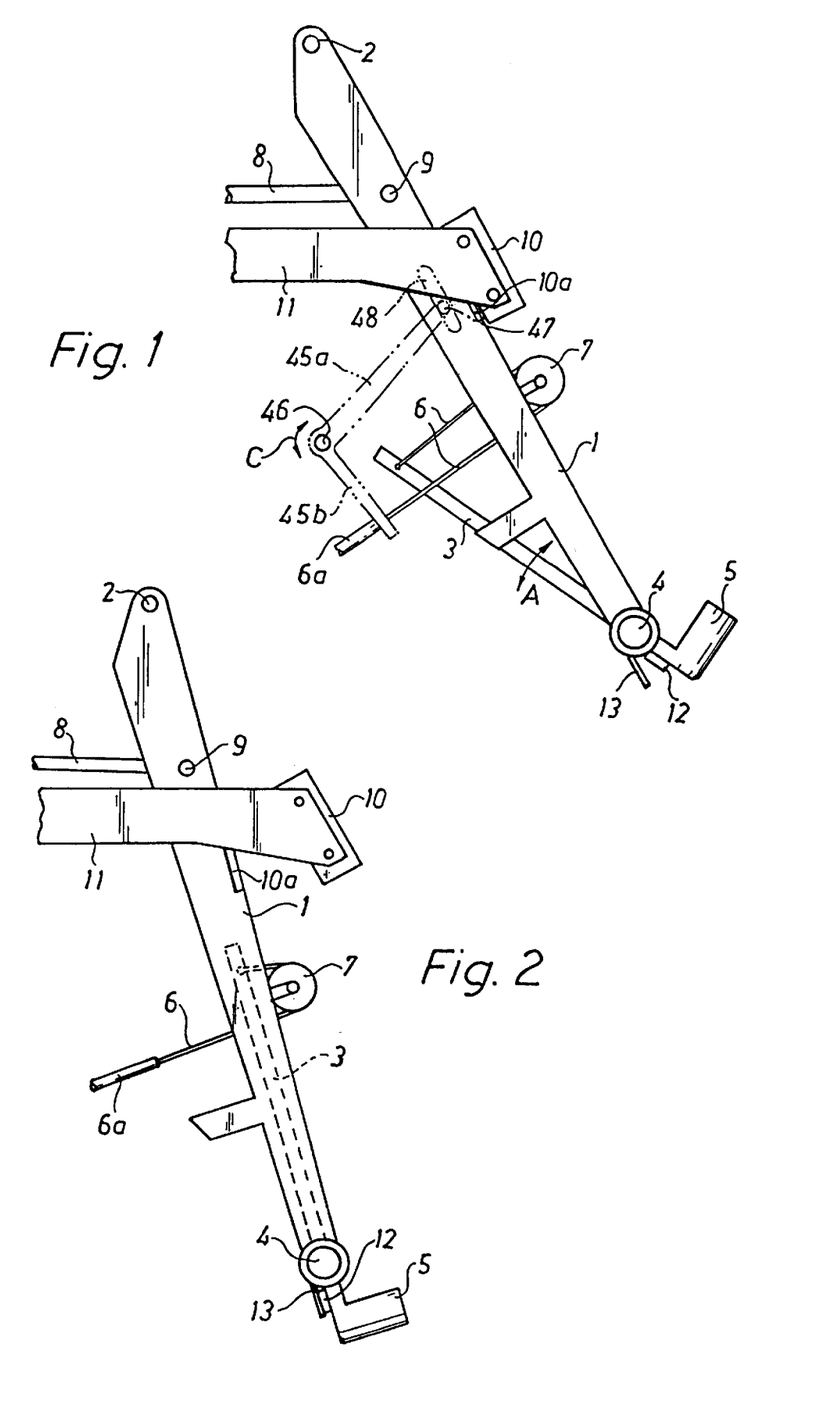
FIGS. 1 and 2 are schematic side views of a braking and a non-braking state of a single-pedal system according to the invention with electromagnetic locking.

The single-pedal system in FIGS. 1 and 2 comprises a pedal holder or brake lever 1 corresponding to the traditional pedal holder for a brake pedal in a conventional three-pedal system. The pedal holder 1 thus is, at its upper end, pivoted about an upper pivot axis 2. A combined brake and gas pedal 3 is arranged at the lower end portion of the pedal holder 1 in a manner that will be described below.

The pedal holder 1 is connected to a brake system (not shown) via a link arm 8 and a joint 9. The invention is not restricted to a special brake system, and the connection schematically shown in FIGS. 1 and 2 should only be considered a non-restricting example. Independently of the choice of brake system and connection thereto, the pedal holder 1 is, in the shown embodiment, pivotable about the axis 2 from a resting position (FIG. 1)—representing a non-braking state of function of the system—to a forwardly pivoted position (FIG. 2)—representing a braking state of function of the system. This pivoting movement is accomplished by the driver pressing, in conventional manner, his foot on the pedal 3.

The single-pedal system also comprises a returning means (not shown) which is arranged to return the pedal holder 1 to the resting position in FIG. 1 and which may consist of, for instance, a spring mounted between the pedal holder 1 and the body of the vehicle. It is also conceivable that such a returning effect is already available in an existing brake system, in which case no additional returning means need be mounted.

The above-mentioned combined brake and gas pedal 3 is turnable relative to the pedal holder 1 about a lower, preferably horizontal pivot axis at reference numeral 4. In the embodiment shown, the pedal 3 is positioned on the right side of the pedal holder 1 and is pivotally mounted on a supporting shaft 4 projecting on the right side of the pedal holder 1. The pedal 3 is elongate transversely of, preferably perpendicular to, the supporting shaft 4 and is arranged to be operated by the driver's one foot, preferably the right foot. The pedal 3 is so positioned relative to the supporting shaft 4 that a relatively short lower part of the pedal 3 is located below the supporting shaft 4, whereas a relatively large, upper part of the pedal 3 is located above the supporting shaft 4. This suspension of the pedal renders the operation of the pedal easy, and it will especially be possible to turn the pedal, by pressing of the heel, in a direction (clockwise in FIG. 1) which reduces the speed of the engine.

At its lower end portion, the pedal 3 has a projecting shoulder 5 which is arranged to support the heel portion of the foot. This support corresponds to the heel support which the floor in the seating compartment constitutes in a conventional pedal system.

The upper end portion of the pedal 3 is connected to one end of a throttle cable 6, which runs over a roller 7 mounted on the pedal holder 1 and which at its other end is connected to a throttle or the like (not shown) of the vehicle engine. The connection of the throttle cable 6 to the engine is conventionally designed and will not be described in more detail. However, the speed of the engine is increased by stretching the throttle cable 6, i.e. extracting the throttle cable from its casing 6a. The roller 7 is mounted so as to be essentially a lost-motion-type roller as the throttle cable 6 is not stretched, whereas a stretched throttle cable 6 generates a rotational resistance on the roller 7 corresponding to the friction when pressing down a conventional accelerator. A preferred embodiment of the mounting of the roller 7 will be described in more detail below with reference to FIGS. 5 and 6.

A locking means is arranged to fix, in the non-braking state of function, the pedal holder 1 in its resting position (FIG. 1). In the embodiment shown in FIGS. 1 and 2, the locking means comprises a stationary electromagnet 10, which is fixedly mounted on the body by means of a holder 11 and which by magnetic force cooperates with a magnetic or metal plate 10a or the equivalent on the pedal holder 1. The holder 11 together with the electromagnet 10 also serves as abutment for the pedal holder 1 when moving towards its resting position. In an alternative, mechanically inverse construction, the electromagnet 10 can be supported by the pedal holder 1 for cooperating electromagnetically with a stationary metal plate.

By varying the operating voltage of the electromagnet 10, it is possible to set the electromagnetic locking force at a suitable strength. Such setting can be carried out by means of e.g. a rotary potentiometer (not shown) and can especially be factory-set. The electromagnetic force can possibly also be varied in other ways.

The single-pedal system in FIGS. 1 and 2 further comprises a disengaging means, in this case arranged at the lower end portion of the pedal 3, in order to accomplish, in a predetermined turning position of the pedal 3 relative to the pedal holder 1, a disengagement of the locking effect of the locking means 10. In the embodiment shown in FIGS. 1 and 2, the disengaging means comprises a switch in the form of a microswitch 12 for switching On/Off the operating voltage of the electromagnet 10. A component 13 for actuating the microswitch 12 is fixedly connected to the lower end portion of the pedal holder 1 and is extended downwards therefrom. In the shown embodiment, the microswitch 12 is actuated by the component 13 when the upper part of the pedal 3 is maximally turned towards the driver (FIG. 2). The component 13 may also serve as abutment for the turning motion of the pedal 3 towards its idling position.

When the pedal 3 occupies the end position, the operating voltage of the electromagnet 10 is interrupted, such that the pedal holder 1 can be pressed down more easily from its resting position for normal braking of the vehicle.

The disengaging means can be arranged in some other manner for accomplishing the same function; for instance, the microswitch 12 and the component 13 can change places. It is also conceivable that instead of a mere switching On/Off of the operating voltage, the operating voltage is controlled between two levels, thereby obtaining a certain, limited holding effect also in the idling position.

The embodiment shown in FIGS. 1 and 2 can also have two different partial ranges of the moving range of the pedal 3, as will be described at the end of this specification.

The function of the single-pedal system in FIGS. 1 and 2 will now be described in more detail. In FIG. 1, the system is in its non-braking state of function, where the pedal holder 1 is kept locked in its resting position by the electromagnet 10. In the resting position, the brake system of the vehicle is not activated. The driver's foot (not shown) is placed on the pedal 3 and can, while driving normally, control the speed of the engine by turning, as indicated by means of arrow A, the pedal 3 back and forth about the supporting shaft 4. When the pedal 3 is turned counterclockwise, the speed of the engine increases and vice versa. In the non-braking state of function of the system, the driver can thus control the speed of the engine in fully conventional manner without noticing any difference between this pedal system and traditional ones. Regarding the driver's experience of the system, especially the supporting function of the heel support 5 should be noted, which in traditional multiple-pedal systems corresponds to the support provided by the floor in the seating compartment.

For normal braking of the vehicle, the driver will initially release the accelerator which in the embodiment involved means clockwise turning of the pedal 3 towards the end position. When the pedal 3 then reaches its end position (in this case, a position in parallel with the pedal holder 1), the microswitch 12 is activated such that the operating voltage of the electromagnet 10 is interrupted. There may also be a range (position of readiness) involving idling and an unbroken retaining force. The retaining force on the pedal holder 1 is now reduced such that the pedal holder 1 can more easily be moved downwards from its resting position. In the next step in the braking of the vehicle, the driver presses down the pedal holder 1 by means of the pedal 3. In this braking operation, the combination of the pedal holder 1 and the pedal 3 serves as a conventional brake pedal and is also experienced as such, without any other resistance than the traditional returning force acting on the pedal holder 1. In its braking state of function, the single-pedal system now occupies a position corresponding to the position in FIG. 2.

However, if the driver, during driving, i.e. at a speed of the engine other than zero, must quickly brake the vehicle (emergency braking), he applies to the pedal holder 1 a compressive force which exceeds the set locking force of the electromagnet 10 (actually, the electromagnetic locking force plus the above-mentioned returning force which also acts on the pedal holder 1). Such emergency braking is carried out by the driver pressing the pedal 3 in the direction of the lower part of the leg relatively hard, whereupon the pedal holder 1 is first released from its engagement with the electromagnet 10 and then pivoted downwards for braking of the vehicle.

In a simpler variant, the disengaging means (microswitch 12) may be omitted. In such a variant, the locking force of the locking means must be overcome in normal braking as well as in emergency braking.

Thanks to the throttle cable 6 being deflected about the roller 7 on the pedal holder 1, the throttle cable 6 will automatically slacken as the pedal holder 1 is pivoted away from the electromagnet 10. This prevents racing of the engine even if the pedal 3 is in full-speed position on the occasion of emergency braking.

On the other hand, when the throttle cable 6 is stretched, i.e. when regulating the speed of the engine, the speed regulation should, however, have a certain inertia (friction) to prevent small and undesired pedal movements from being immediately transmitted to the engine. Otherwise, there is a possible risk that such undesired movements via the throttle cable 6 are allowed to affect the engine, for instance, when the car is running over irregularities of the roadway. This could result in uncontrolled oscillation effects in the regulation of the speed.

FIG. 1 indicates by dashed lines a device for controlling the cable casing 6a. The purpose of this device, which may be regarded as an option, is to prevent simultaneous opening of the throttle and braking. The device comprises an L-shaped bracket 45a, 45b which in its angular part is pivoted to a shaft 46 for pivoting in the direction of arrow C. One leg 45a of the bracket is at its end movably connected to the pedal holder 1 by means of a pin 48 or the like which is slidably guided in an elongate opening 47 in the pedal holder 1. The other leg 45b of the bracket is at its end connected to the cable casing 6a. This device functions as follows: When the pedal holder 1 is pressed down in the case of braking, this results in the pin 47 being moved upwards in the opening 48, which in turn implies that the L-shaped bracket 45a, 45b is pivoted counterclockwise. This results in the end of the cable casing 6a being pulled to the right in the Figure relative to the throttle cable 6, thereby reducing the tension of the cable. This ensures that braking and opening of the throttle do not take place simultaneously. In a variant, the throttle cable casing can instead be controlled by a separate cable system.

If the brake system has a short length of stroke, i.e. if the pedal holder 1 performs a short pivoting motion between its resting position and a braking position, the braking of the vehicle will be jerky. This is due to the fact that the driver must apply a relatively great force to the pedal 3 to overcome the locking force of the electromagnet 10. When the electromagnet 10 releases its hold, the pedal holder 1 in such a construction quickly pivots to its braking end position, which results in a sudden braking of the vehicle. Such a short length of stroke can be desirable, for instance, in connection with an electronically controlled throttle lever.

Especially for a short length of stroke it is therefore advisable to incorporate the above-mentioned disengaging means 12 into the single-pedal system. When the pedal 3 is pivoted to a predetermined position, the disengaging means 12 is activated, which in the present embodiment implies that the microswitch is contacted with the abutment 13 which is fixedly mounted on the pedal holder 1, whereupon the electromagnet 10 is disengaged and the pedal holder 1 can be pivoted towards its braking position without resistance from the electromagnet 10. In this manner, a soft braking is permitted during normal driving. To prevent the pedal holder 1 from being released each time the pedal 3 is moved close to its idling position, for instance in a normal reducing of the speed of the engine, the disengaging means 12 can be arranged in such a manner that the driver must overcome a minor resistance in order to activate the disengaging means 12, for instance by letting a low operating voltage lie over the electromagnet also in the idling position of the accelerator.

Summing up, it may be established that both normal braking and emergency braking take place in a manner that is well known to the user, i.e. by pressing the pedal 3 in the direction of the lower part of the leg. If the single-pedal system comprises a disengaging means 12, the driver need only turn his foot upwards about the ankle joint before normal braking. This is also a movement which is natural in the context, since the speed of the engine is thus reduced. In emergency braking however, braking can take place immediately without any preceding upwards turning of the pedal, which shortens the total braking distance.

Figures 3, 4:
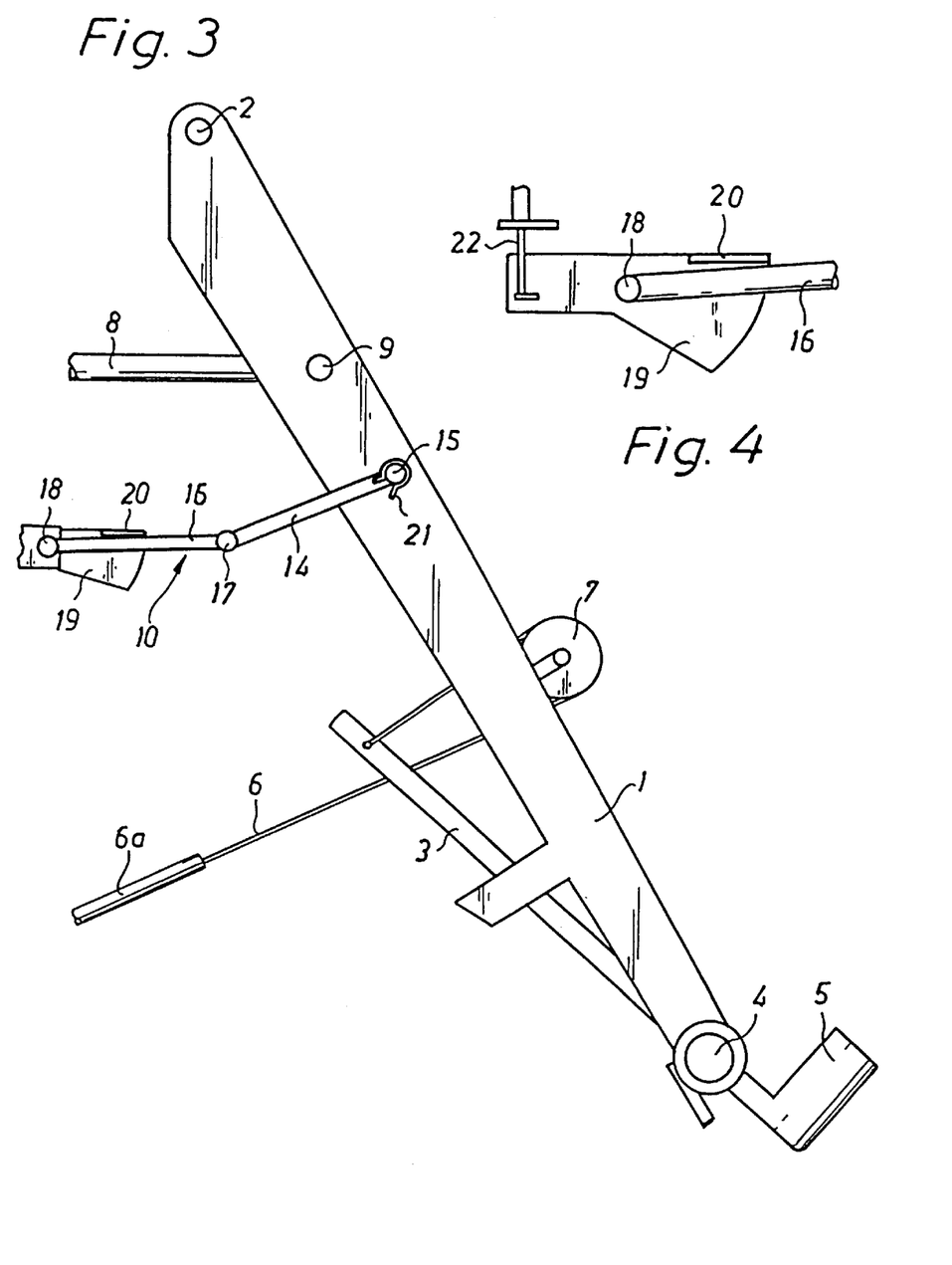
FIG. 3 is a schematic side view of a braking state of a single-pedal system according to the invention with mechanical locking.
FIG. 4 illustrates a broken-away part of the system in FIG. 3 on a larger scale.

FIGS. 3 and 4 illustrate an embodiment of a single-pedal system according to the invention having a mechanical locking means 10. Components that are equivalent to those in FIGS. 1 and 2 have the same reference numerals, and the function of these components will not be repeated. The mechanical locking means 10 here comprises on the one hand a first arm 14, which via a first joint 15 is pivotally connected to the pedal holder 1 and, on the other hand, a second arm 16 which via a second joint 17 is pivotally connected to the first arm 14. The second arm 16 is in turn pivotally mounted on a pivot 18 which is connected to the body of the vehicle and on which a plate 19 is rotatably mounted. The plate 19 is formed with a projection 20, which extends therefrom in a plane perpendicular to the pivoting plane of the arms 14, 16. The projection 20 is designed to constitute, in the locking position of the locking means 10, an upper abutment for the second arm 16. A spring element 21 is arranged adjacent to the first joint 15 for actuating the first arm clockwise and thus facilitate the returning of the pedal holder 1 to its locked resting position.

The locking force of the locking means 10 is determined by the angle between the first arm 14 and the second arm 16. It will be appreciated that the mechanical locking means 10 fixes the pedal holder 1 in its resting position and that the pedal holder 1 is released from its locked resting position by the arms 14, 16 being pivoted towards each other about the second joint 17 if a sufficient pressing force is applied to the pedal holder 1. After the release, the locking force is essentially negligible, and therefore the pedal holder 1 will be pivoted to a braking position.

As schematically illustrated in FIG. 4, the rotatable plate 19 is connected to a cable 22 for setting the locking force of the locking means 10. When the cable 22 is tensioned, the plate 19 and, thus, also the projection 20 are rotated clockwise, which causes a reduction of the angle between the arms 14, 16. This results in a reduction of the locking force of the locking means 10.

Figure 5:
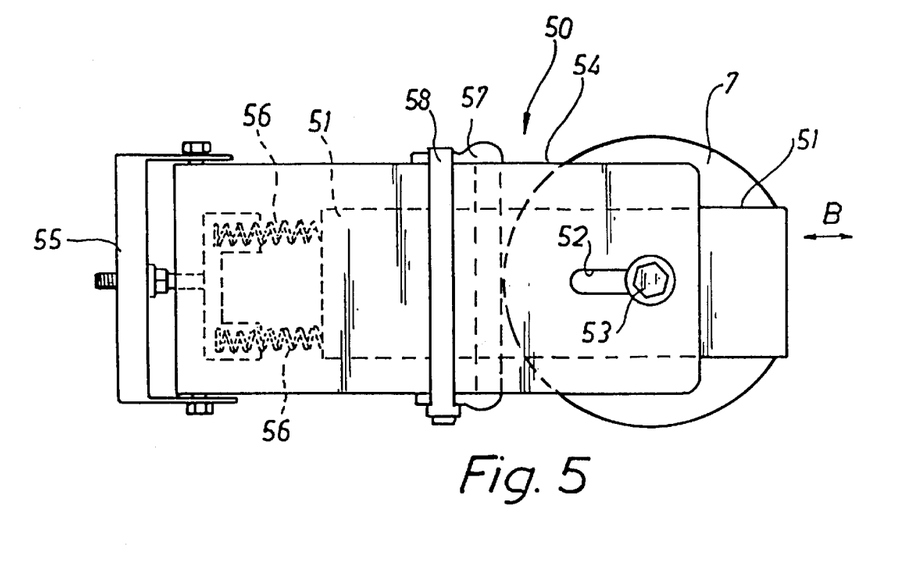
FIG. 5 is side view of a friction-generating cable-deflecting device.
Figure 6:
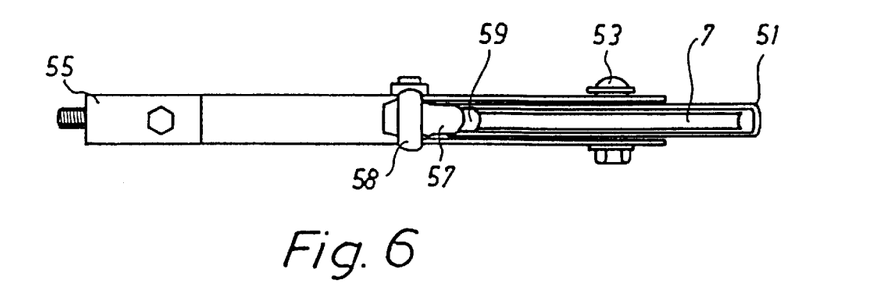
FIG. 6 is a top plan view along line VI—VI in FIG. 5.

Reference is now made to FIGS. 5 and 6 which show a friction-generating cable-deflecting device 50 which can be used in the above embodiments to generate friction as the throttle cable 6 is tensioned. The device 50 comprises the roller 7, which, by means of a shaft 53, is rotatably mounted in a movable inner holder 51. The latter is displaceably (arrow B) mounted in a fixed outer holder 54, which in turn is mountable on the pedal holder by means of a fitting 55. During said displacement, the shaft 53 is guided in an elongate opening 52. A friction element 57, such as a rubber element, is extended through the outer holder 54 and is held by a clamping member 58. Two compression springs 56 urge the inner holder 51 away from the outer holder 54 such that there is a space between the roller 7 and the friction element 57. When tensioning the throttle cable 6 (not shown), the springs 56 are compressed, and the roller 7 is moved into contact against the friction element, which results in the desired friction.

FIGS. 7–11 illustrate an embodiment of a single-pedal system according to the invention with an electromagnetic locking means for a vehicle having an electronic/electric throttle lever instead of a cable-controlled throttle lever as in the preceding embodiments. The embodiment in FIGS. 7–11 utilises an electromagnetic locking means according to the embodiment in FIGS. 1 and 2. Components that are equivalent to those in the above-described embodiments have the same reference numerals, and the function of these components will not be repeated. Reference numeral 8' concerns components of a traditional brake system.

Figure 7:
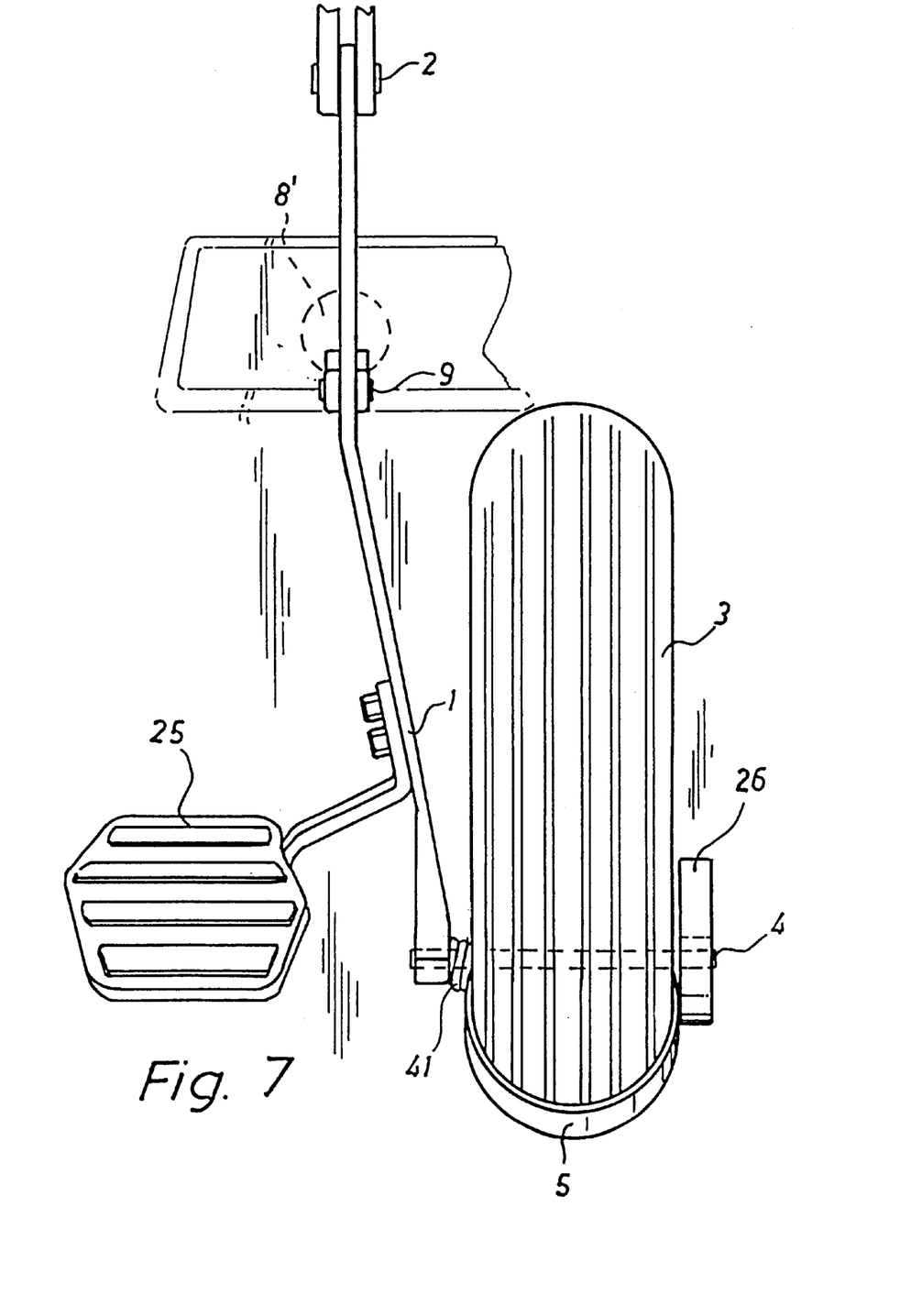
FIG. 7 is a schematic side view of a single-pedal system according to the invention with electronic throttle lever.
Figure 8:
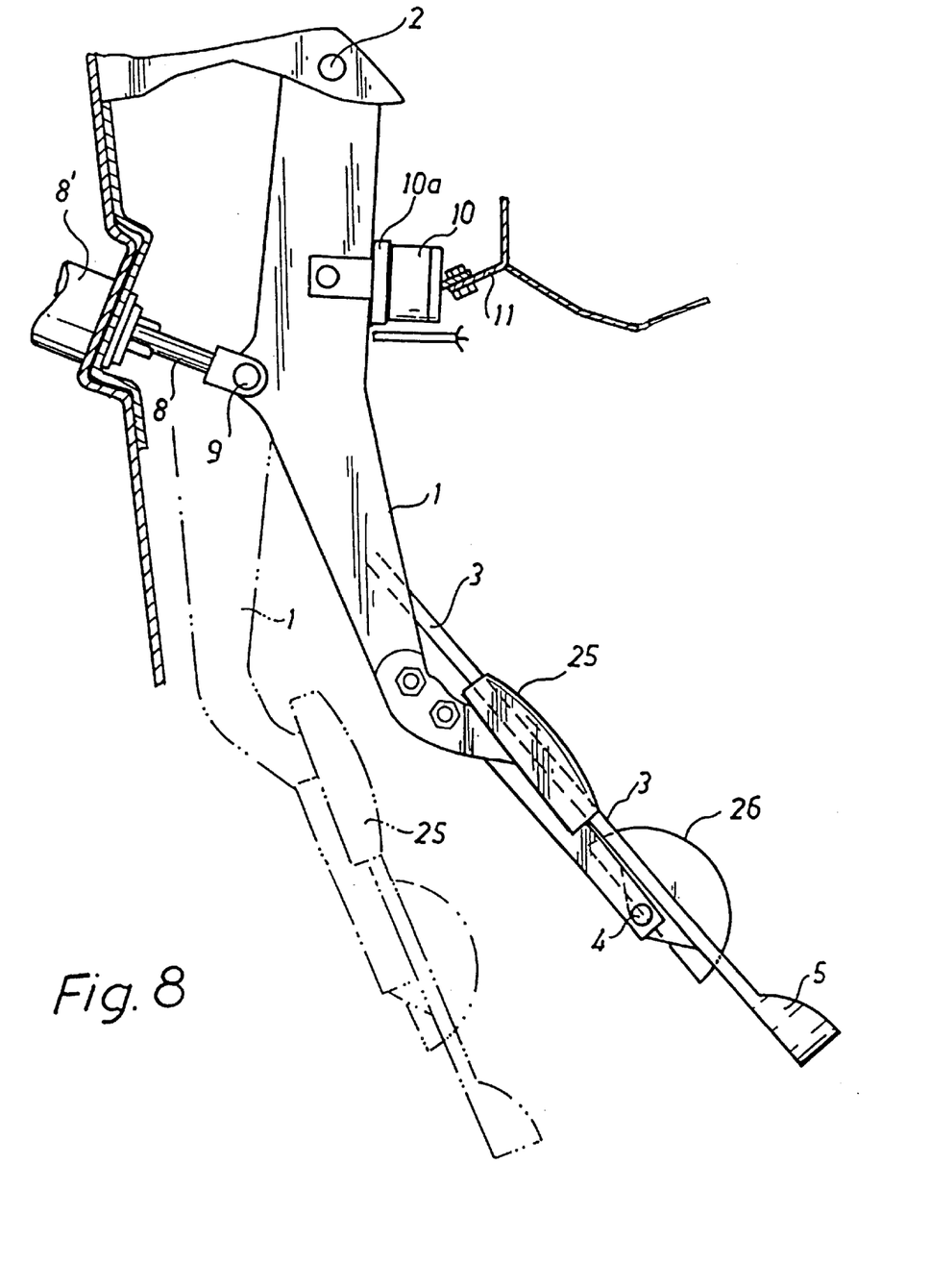
FIG. 8 is a side view of the single-pedal system in FIG. 7 in a non-braking state.
Figure 9:
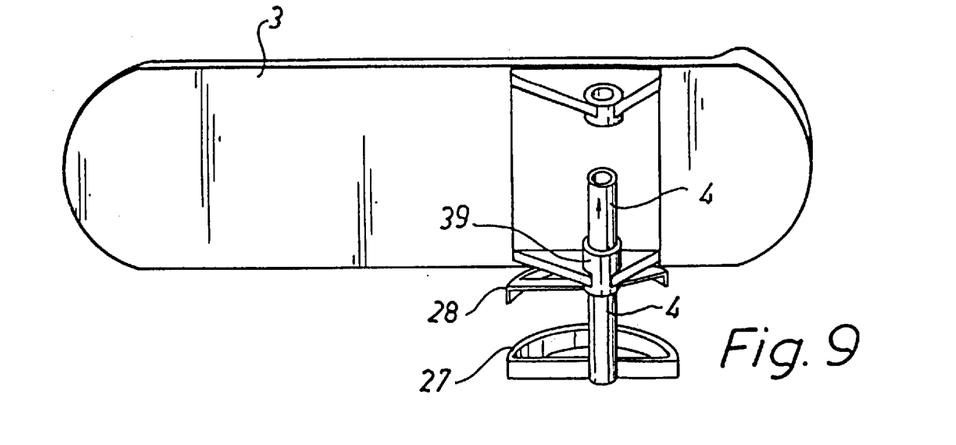
FIG. 9 is a perspective bottom view of an accelerator of the single-pedal system in FIGS. 7 and 8 during mounting of the system, FIGS. 10A, B and 11A, B illustrate two types of a first and a second half of a throttle transducer in the system in FIGS. 7 and 8.

It appears from FIG. 7, which shows the system seen from above, how the pedal 3 is suspended on the right side of the pedal holder 1. FIG. 7 also shows how a "normal" brake pedal 25 is mounted to the left of the combination pedal 3. This brake pedal 25 is arranged for reasons of security in case the driver, by force of habit, moves his right foot to the left when braking. The brake pedal 25 can also be necessary to satisfy any requirements issued by the authorities. Such a safety or auxiliary brake pedal 25 can be arranged in all embodiments of the invention. In a preferred embodiment, such a safety pedal 25 can be supplemented with a switch (not shown) or the like to make the locking means reduce or interrupt the locking force applied to the pedal holder 1 as soon as the pedal 25 is pressed down.

FIG. 7 also shows a return spring 41 which is arranged on the supporting shaft 4 and which actuates the pedal 3 towards its idling position and which in functional respect corresponds to the returning force which is normally present in a traditional, mechanical throttle lever.

A combination unit 26, which is arranged on the supporting shaft 4 to the right of the pedal 3, functions as:

1. transducer for the electronic throttle lever,
2. abutment for defining the end positions of the pedal 3,
3. switch for the electromagnet 10, and
4. friction element for the pedal 3.

Figure 10A:
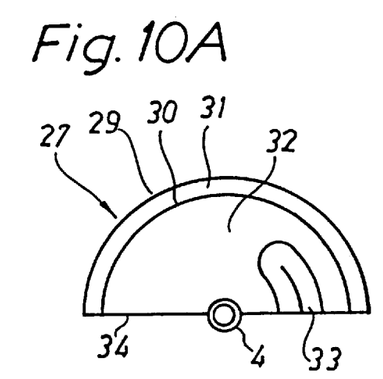
Figure 10B:
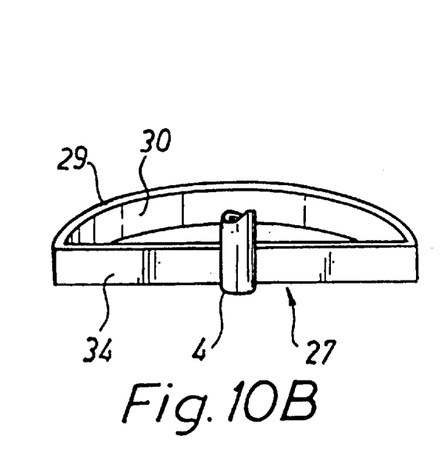
Figure 11A:
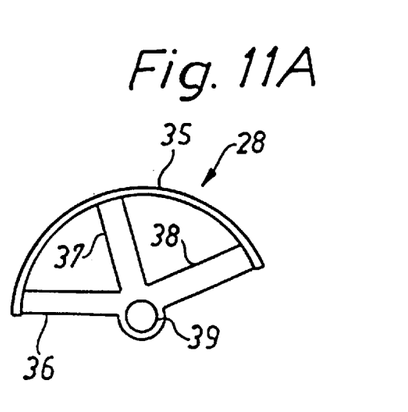
Figure 11B:
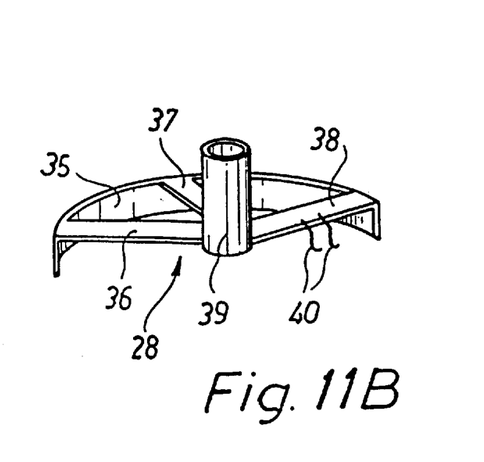

The combination unit 26 has an essentially semicircular shape and comprises a first stationary half 27 according to FIGS. 10A and B, and a second movable half 28 according to FIGS. 11A and B.

The first half 27 (FIGS. 10A and B) is fixed to the supporting shaft 4 (see FIG. 9) and is composed of an outer and an inner wall 29, 30 which have the form of a circular arc and extend through an angle $\alpha$ (180° in this embodiment) and which define a radial space 31. The two walls 29, 30 having the form of a circular arc are supported by a semicircular plate 32, whose inner side is provided with a resistance in the form of a carbon path 33 or the like. The carbon path 33 is in this case U-shaped. The walls 29, 30 and the plate 32 are connected with a diametrical bottom wall 34 which is fixedly connected to the supporting shaft 4.

The second half 28 (FIGS. 11A and B) of the combination unit 26 comprises a intermediate wall 35 having the form of a circular arc, which has such a radius of curvature as to fit in the space 31 between the fixed walls 29, 30 having the form of a circular arc and which extends through an angle $\beta<\alpha$. The intermediate wall 35 is connected, by three spokes 36–38, to a central sleeve 39, in which the supporting shaft 4 is mounted and which is rigidly connected to the pedal 3. Two trailing contacts 40 (FIG. 11B) are arranged on one spoke 38 to slide against and cooperate with the carbon path 33.

In response to the pedal 3 being pivoted back and forth about the supporting shaft 4 for controlling the speed of the engine, the intermediate wall 35 is moved back and forth in the space 31. The difference $\alpha-\beta$ (for instance 15–20°) defines the possible pivoting angle of the pedal 3 between idling position and full-speed position. The end positions are reached when the movable intermediate wall 35 abuts against the stationary bottom wall 34.

The combination unit 26 also serves as transducer for the electronic throttle lever by the carbon path 33 and the trailing contacts 40 together constituting a variable resistance, which, in a manner not described in detail, is electrically connected to an electronic throttle lever (not shown) of the vehicle. Thanks to the carbon path 33 being U-shaped, a "gear ratio" is obtained, thereby obtaining a sufficient resistance difference in spite of the limited pivoting motion of the pedal 3 (in this case about 15–20°).

The combination unit 26 can also be used to control the locking means, in the embodiment involved, for instance, as a switch for interrupting, in the idling position, the operating voltage of the electromagnet 10 and, thus, the retaining force applied to the pedal holder 1. This can be achieved by a switch (not shown) being arranged on the two halves 27 and 28. This switch can be arranged in the form of e.g. an additional carbon path on the stationary half 27.

The combination unit can also function as a friction-generating unit when pivoting the pedal 3. This can be achieved if the inner diameter of the stationary sleeve 39 is made somewhat greater than the outer diameter of the supporting shaft 4. When the driver's foot applies a compressive force to the pedal 3, the centre of the sleeve 39 is moved downwards relative to the supporting shaft 4, and thus the movable intermediate wall 35 is moved into abutment against the stationary inner wall 29. A pivoting of the pedal 3 results in a counteracting frictional moment between these two surfaces. This results in a frictional force corresponding to the frictional force arising in connection with traditional cable controlling of a throttle lever. It will be appreciated that the size of the frictional force depends on the width and radius of the combination unit.

The invention has now been described with reference to some non-limiting embodiments, and it may be modified in various ways within the scope of the claims.

Other locking means can be used, such a ball which, by means of a spring connected to the body of the vehicle, is biased perpendicular to the pivoting plane of the pedal holder. In the resting position of the pedal holder, the ball is received in a recess formed in the pedal holder. When the driver applies to the pedal holder a compressive force which exceeds a predetermined value, the engagement between the ball and the pedal holder is released, whereupon the latter can be pivoted to a braking position.

It will also be appreciated that the above-described mechanical locking means can be connected mechanically or electrically to a disengaging means so as to facilitate the disengaging of the pedal holder in a certain pedal position.

Moreover, the single-pedal system according to the invention can be designed in such manner that speed regulation is possible in all pivoting positions of the pedal holder. This may be desirable, for instance, in rallies and can be accomplished by means of a different deflection of the throttle cable, which will be obvious to those skilled in the art.

Furthermore, the movements of the pedal holder and the pedal can be other than those shown in the examples, e.g. linear movements or a combination of pivoting and linear movements.

In the embodiments shown and described, the shaft 4 of the pedal is positioned under the pedal. It may, however, be preferred (for instance for ergonomic reasons) to move the pedal shaft 4 upwards so as to be closer to the ankle joint or coincide therewith. Besides it is possible to move the shaft 4 upwards or downwards relative to the pedal, compared with the embodiments.

It is also conceivable to arrange the electromagnet 10 so close to the plate 10a that the electromagnetic force can contribute to the returning of the pedal holder 1 to its resting position.

Figure 12:
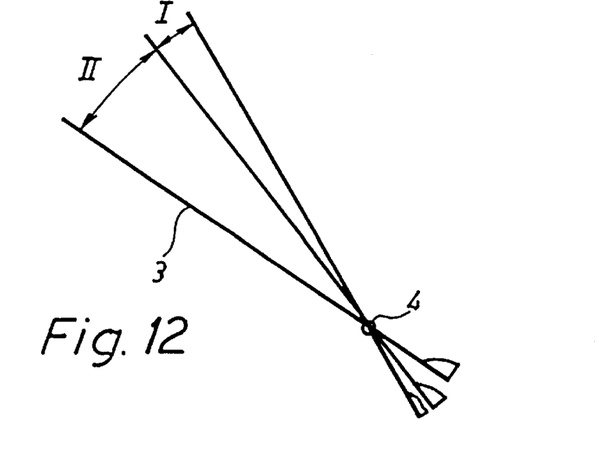
FIG. 12 is a schematic view of a variant of the invention.

In all embodiments of the invention, the pivoting range of the pedal 3 can be divided into two sub-ranges "I" and "II", as schematically illustrated in FIG. 12. If the total angular range is, say, 15°, the sub-range "I" can be for instance 1–5° only. In the range "I" there is only idling and there is also no essential returning force acting on the pedal 3. In the sub-range "II", the speed of the engine is successively increased. The locking means (magnet 10) releases its hold when the pedal 3 is maximally pivoted upwards in the end position in the range "I". The advantage of such a variant is to resemble a "position of readiness" which one normally has in a two-pedal system, where one raises the foot from the accelerator and holds it in a state of readiness over the brake pedal. Especially, this variant of the invention can be accomplished by means of the combination unit 26, which will then have an additional function.

I claim:

1. A single-pedal system for controlling the speed of the engine and the braking effect in a motor vehicle, said system comprising:

a pedal holder, which is mounted for movement from a resting position for effecting braking of the vehicle, and a pedal, which is movably supported on the pedal holder for controlling the speed of the engine of the vehicle; and a lock arranged to hold, in a non-braking state of function of the system, the pedal holder in its resting position and, for passing to a braking state of function of the system, to permit the pedal holder to be moved from its resting position if a force exceeding a predetermined value is applied to the pedal holder, wherein the lock comprises an electromagnet.

2. A single-pedal system as claimed in claim 1, comprising returning means for returning the pedal holder to the resting position.

3. A single-pedal system as claimed in claim 2, comprising means for setting the predetermined value.

4. A single-pedal system as claimed in claim 2, comprising a disengaging device which is arranged to facilitate, in a predetermined position of the pedal in relation to the pedal holder, disengagement of the pedal holder.

5. A single-pedal system as claimed in claim 2, wherein the pedal comprises a foot support.

6. A single-pedal system as claimed in claim 2, comprising a rotatable device which is arranged on the pedal holder and is arranged to receive a throttle cable extending between the pedal and the engine of the vehicle.

7. A single-pedal system as claimed in claim 2, wherein the pedal is connected to the engine of the vehicle such that a movement of the pedal holder from its resting position to a braking position implies a reduced speed of the engine.

8. A single-pedal system as claimed in claim 1, wherein the pedal is pivotally connected to the pedal holder.

9. A single-pedal system as claimed in claim 1, wherein the lock, for holding the pedal holder in its resting position, is arranged to generate a locking force, which is zero or essentially negligible in the braking state of function of the system.

10. A single-pedal system as claimed in claim 1, comprising means for setting said predetermined value.

11. A single-pedal system as claimed in claim 1, wherein the pedal comprises a foot support.

12. A single-pedal system as claimed in claim 1, comprising a rotatable device which is arranged on the pedal holder and is arranged to receive a throttle cable extending between the pedal and the engine of the vehicle.

13. A single-pedal system as claimed in claim 1, wherein the pedal is connected to the engine of the vehicle such that a movement of the pedal-holder from its resting position to a braking position implies a reduced speed of the engine.

14. A single-pedal system as claimed in claim 1, wherein the lock is arranged in the path of motion of the pedal holder so as to function also as an abutment for the pedal holder.

15. A single-pedal system for controlling the speed of the engine and the braking effect in a motor vehicle, the system comprising:

a pedal holder, which is mounted for movement from a resting position for effecting braking of the vehicle, and a pedal, which is movably supported on the pedal holder for controlling the speed of the engine of the vehicle;

a lock arranged to hold, in a non-braking state of function of the system, the pedal holder in its resting position and, for passing to a braking state of function of the system, to permit the pedal holder to be moved from its resting position if a force exceeding a predetermined value is applied to the pedal holder; and returning means for returning the pedal holder to the resting position, wherein the lock produces a returning effect of the pedal holder to the resting position.

16. A single-pedal system for controlling the speed of the engine and the braking effect in a motor vehicle, the system comprising:

a pedal holder, which is mounted for movement from a resting position for effecting braking of the vehicle, and a pedal, which is movably supported on the pedal holder for controlling the speed of the engine of the vehicle;

a lock arranged to hold, in a non-braking state of function of the system, the pedal holder in its resting position and, for passing to a braking state of function of the system, to permit the pedal holder to be moved from its resting position if a force exceeding a predetermined value is applied to the pedal holder; and a disengaging device which is arranged to facilitate, in a predetermined position of the pedal in relation to the pedal holder, disengagement of the pedal holder.

17. A single-pedal system as claimed in claim 8, wherein the disengaging device comprises a micro-switch associated with the pedal.

18. A method for forming a single-pedal system for controlling the speed of the engine and the braking effect in a motor vehicle, by converting an existing multiple-pedal system comprising an existing accelerator and an existing brake pedal which is separate from the accelerator and which is supported on a pedal holder mounted for movement from a resting position for effecting braking of the vehicle, comprising the following steps:

removing the existing accelerator, removing the existing brake pedal from the pedal holder, mounting on the pedal holder a combination pedal to be movably supported on the pedal holder for controlling the speed of the engine, mounting a lock which is arranged to hold, in a non-braking state of function of the single-pedal system, the pedal holder in its resting position and, for passing to a braking state of function of the system, to permit the pedal holder to be moved from its resting position if a force exceeding a predetermined value is applied to the pedal holder.

19. A method for forming a single-pedal system for controlling the speed of the engine and the braking effect in a motor vehicle, by converting an existing multiple-pedal system comprising an existing accelerator and an existing brake pedal which is separate from the accelerator and which is supported on a pedal holder mounted for movement from a resting position for effecting braking of the vehicle, comprising the following steps:

removing the existing accelerator, removing the existing brake pedal from the pedal holder, mounting on the pedal holder a combination pedal to be movably supported on the pedal holder for controlling the speed of the engine, mounting a lock which is arranged to hold, in a non-braking state of function of the single-pedal system, the pedal holder in its resting position and, for passing to a braking state of function of the system, to permit the pedal holder to be moved from its resting position if a force exceeding a predetermined valve is applied to the pedal holder, wherein the lock comprises an electromagnet.

* * * * *